United States Patent
Axelsson

(10) Patent No.: US 7,707,424 B2
(45) Date of Patent: Apr. 27, 2010

(54) SECURE FILE TRANSFER

(75) Inventor: Stefan Axelsson, Sävedalen (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1395 days.

(21) Appl. No.: 10/510,911

(22) PCT Filed: Apr. 9, 2002

(86) PCT No.: PCT/SE02/00588

§ 371 (c)(1),
(2), (4) Date: May 2, 2005

(87) PCT Pub. No.: WO03/088566

PCT Pub. Date: Oct. 23, 2003

(65) Prior Publication Data

US 2005/0204142 A1    Sep. 15, 2005

(51) Int. Cl.
*H04L 9/00* (2006.01)
*G06F 21/00* (2006.01)

(52) U.S. Cl. .................. 713/179; 713/181

(58) Field of Classification Search .............. None
See application file for complete search history.

(56) References Cited

U.S. PATENT DOCUMENTS

| 5,497,421 | A | 3/1996 | Kaufman |
| 5,666,415 | A | 9/1997 | Kaufman |
| 6,021,202 | A | * 2/2000 | Anderson et al. ............. 705/54 |
| 6,209,095 | B1 | * 3/2001 | Anderson et al. ............ 713/176 |
| 6,260,145 | B1 | * 7/2001 | Komura et al. .............. 713/176 |
| 6,609,200 | B2 | * 8/2003 | Anderson et al. ............ 713/176 |
| 6,643,773 | B1 | * 11/2003 | Hardjono .................... 713/153 |
| 6,671,821 | B1 | * 12/2003 | Castro et al. .................... 714/4 |
| 6,807,632 | B1 | * 10/2004 | Carpentier et al. .......... 713/165 |
| 6,959,089 | B1 | * 10/2005 | Sprunk ....................... 380/239 |
| 7,010,689 | B1 | * 3/2006 | Matyas et al. ............... 713/168 |
| 7,143,113 | B2 | * 11/2006 | Radatti ....................... 707/200 |
| 7,234,059 | B1 | * 6/2007 | Beaver et al. ............... 713/170 |
| 2001/0047400 | A1 | * 11/2001 | Coates et al. ................ 709/219 |
| 2002/0178271 | A1 | * 11/2002 | Graham et al. .............. 709/229 |
| 2003/0097564 | A1 | * 5/2003 | Tewari et al. ............... 713/171 |
| 2006/0173968 | A1 | * 8/2006 | Vaarala et al. .............. 709/214 |

FOREIGN PATENT DOCUMENTS

WO    WO 0057370 A1    9/2000

* cited by examiner

*Primary Examiner*—Christopher A Revak

(57) ABSTRACT

A method and apparatus are provided for identification/authentication of file transfers, that limits the attackers window of opportunity and that aims at incurring a minimum of overhead on the information processing between a client (CL) and a server (SV). According to a preferred embodiment of the invention hash functions (H1-H4) are involved at the server side and the client side. The client and server share a common secret value (S).

7 Claims, 1 Drawing Sheet

US 7,707,424 B2

SECURE FILE TRANSFER

FIELD OF THE INVENTION

The present invention relates to a secure method for file transfer in communication systems. More specifically, the invention relates to a method of file request and file transfer in which the authenticity of the engaging parties can be assured but in which the confidentiality can not necessarily be ensured.

BACKGROUND OF THE INVENTION

A known General Packet Radio System (GPRS) mobile communication system comprises so-called GSN (GPRS Support Node) nodes which route packet information between the Internet and radio base stations. The WPP(Wireless Packet Platform)-based GSN nodes contain different kinds of processing boards, with or without off-line storage capacity. In case the board has no off-line storage capacity (e.g. hard disc), the board must somehow be booted remotely from another board via the node internal TCP/IP network. The boards/processors responsible for booting other boards are named NCB's, which is an acronym for Node Control Boards, as they also fill this function. The boot process involves the transfer of files between the NCB and the boards to be booted. The boards are connected via a TCP/IP network running over an Ethernet.

The above networks have the intrinsic property that they allow third parties to listen to all traffic that passes over the network. Hence, somebody may eavesdrop on the conversation between two parties A and B that communicate over the network. This problem is off course known from many other communication systems and situations.

An attacker that has gained access to the internal network can thus listen to traffic that passes between two boards, thus breaking confidentiality of the data. The attacker can initiate traffic to a board, posing as someone else, in effect lying about his credentials, thus breaking the authentication property between parties. The attacker can also inject traffic in communication that is ongoing, in effect altering the traffic, thus breaking integrity of the data.

Cryptographic methods are typically employed to solve the above kind of problems. However, they come at a cost in processing power and processing time, for example for encrypting/decrypting a file or calculating elaborate checksums. Moreover, they typically result in many extra messages/roundtrips over the network. FTP (File Transfer Protocol) messages over IPsec (IP security protocol)/IKE (Internet Key Exchange) is one example of relatively complex security routines.

SUMMARY OF THE INVENTION

It is a first object of the present invention to set out a method that provides identification/authentication of the requesting party for file transfers, while limiting an attackers window of opportunity and incurring a minimum of overhead on the communication between the parties as well as requiring a minimum of information processing for the parties.

It is a second object of the present invention to set out a method that provides identification/authentication of the serving party for file transfers.

The method according to the invention can easily be implemented in many communication protocols.

It is a further object to set forth a client taking part in a secure file transfer operation.

It is a further object to set forth a server taking part in a secure file transfer operation.

Further advantages will appear from the following detailed description of the invention.

DETAILED DESCRIPTION OF A PREFERRED EMBODIMENTS OF THE INVENTION

A preferred method according to the invention builds on two concepts. The first is that of a cryptographically secure hash algorithm such as MD5 or SHA-1. These algorithms basically compute a binary value (hash) that describes (fingerprints) the input such that it is computationally infeasible to find the input (any input) that produces the given hash or to find two inputs (any two) that computes to the same hash (any hash).

The second concept is that of a shared secret between the server and the client, i.e. a random binary string of sufficient length that is unknown to outsiders, but known to both the client and the server.

Figure 1:
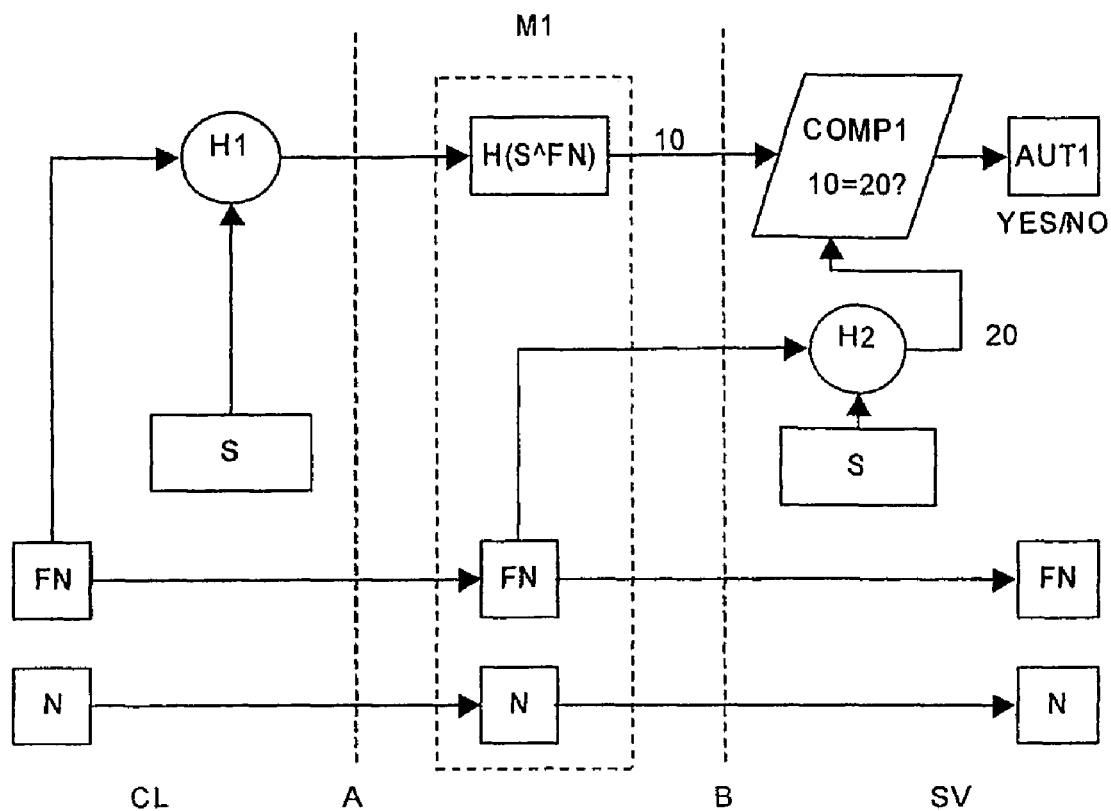
FIG. 1 shows a first message from a client to a server according to a first embodiment of the invention.

In FIG. 1 the process of a client CL requesting a file F with a filename FN from a server SV has been shown. It should be noted, that the terms client and server could amount to any two parties involved in a communication session and that the terms filename and file could amount to virtually any type of information on any format such as data files or packets of data. As illustrated, the client CL communicates over a first interface A over a media to a second interface B of a server SV.

Figure 2:
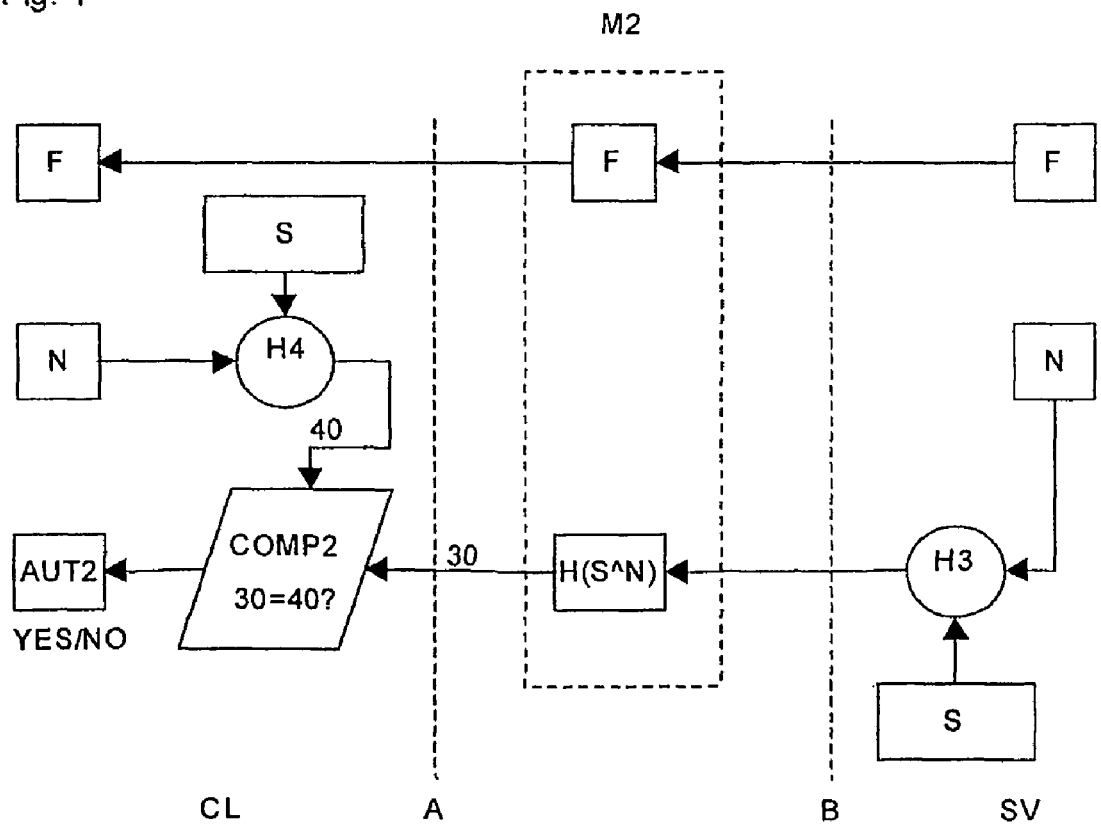
FIG. 2 shows a second message from a server to a client according to a first embodiment of the invention.

In FIG. 2 the process of the same server SV responding to the same client has been shown, whereby the file corresponding to the requested filename is returned.

A random string, a so-called nonce, N, is used to prevent replay attacks. This nonce is generated by the client and associated with the requested file name.

Both the client and the server share a mutual secret value S, which is normally not transported over the network. The key distribution problem could be solved, for instance by an operator feeding in the secret value S in the client/server. Typically, a group of servers and clients could share the secret value S and hence belong to an "accepted" group.

The method of authentication shall now be explained with regard to FIGS. 1 and 2. The steps can easily be incorporated into many communication protocols as it only involves two messages.

As shown in FIG. 1, the client forms a first message M1 comprising, a filename FN, and a nonce N that is associated with the given filename FN. The nonce is preferably unique for every individual request of filename.

The client also processes a first hash value H(S^FN); 10 according to a first hash function H1, H2 formed from the concatenated values of the filename FN and the secret value S. The first hash value is incorporated in the first message, for instance by concatenation, i.e. if serial data streams are contemplated, one value is presented after the other. The concatenation could off course also take other forms such as a predetermined mixed pattern. Moreover, the inputs to the hash function could alternatively be formed from an XOR function H(S XOR FN) or add function H(S+FN).

Subsequently, the server extracts the filename FN of the received message M1 and extracts the first hash value 10.

The server is also forming a concatenated value of the received filename FN and the secret value S, while forming a second hash value H(S^FN); 20 according to the first hash function H1, H2 formed from the concatenated value of the filename FN and the secret value S.

The server compares the first hash value 10 with the second hash value 20 and if the values are the same, the server establishes that the first message M1 stems from a client belonging to the accepted group. If the values are not the same, the server establishes that the client does not belong to the accepted group. Hence, the server checks that the hash of the clear text file name received in the request, concatenated with its know shared secret matches the hash it received.

As shown in FIG. 2, the server responds to the request from the client by forming a second message M2 comprising a file F corresponding to the requested filename FN. The nonce N which the server previously received and which is associated with the given filename FN is concatenated with the shared secret value S and input to a second hash function H3, H4 from which a third hash value H(S^FN); 10 is formed. This hash value is included in the second message M2.

This second message M2 is transferred to the requesting client, which then again extracts the filename FN of the received message M1 and the third hash value 10 from the second message.

Thereafter, the client forms a concatenated value of the received filename FN and the secret value S. From this value the client forms a fourth hash value H(S^N); 40 according to the second hash function H3, H4 formed from the concatenated value of the nonce FN associated with the requested filename and the secret value S.

The first hash function H1, H2 could be identical to the second hash function H3, H4 or the first and the second hash functions could be different functions.

Subsequently, the client compares the third hash value 30 with the fourth hash value 40 and if the values are the same, it establishes that the second message M2 stems from a server belonging to the accepted group, otherwise it establishes that the server does not belong to the accepted group. Hence, the client checks that a hash of the known shared secret concatenated with the nonce it sent in the first message matches the hash it received.

A replay attack is an attack where the attacker replays a previously captured message without knowing anything about the internal structure of the message, i.e. without having done any cryptanalysis of the message.

It is noted that a potential attacker never sees S directly, and hence cannot send H(S^X), without having previously seen H(S^X), where X is the filename or the file. In the first step, the client demonstrates to the server that it knows S and protects FN from being tampered with. In the case of a replay attack, the attacker can only gain access to a file that has previously been requested by a client that knew S and hence the attacker cannot learn the contents of a new (i.e. previously unseen) file.

In the reply, the client learns that the server also has knowledge of S, and replay is prevented by the addition of the nonce N, that the client remembers from the request. N must be chosen in such a way that it is unlikely that an attacker through observation can build a database of all possible values of H(SAN) since it could then impersonate the server.

Note that if we assume unique values of N there is no need for the filename to be included in the message from the server to the client, since it can be inferred from the fact that the server obviously knew it (it's included in the hash) and hence is trusted to send us the correct, and corresponding file. In the protocol presented above, we have made such an assumption.

In order for the nonce N to be unique it is suggested that it is formed by some uniquely increasing number, for example the current date and time in seconds since 1 Jan. 1970, concatenated with a random number of sufficient length to make the distinguishing of different file requests possible, say 128 bits or the like.

The shared secret S should also be of sufficient length to prevent plain text guessing attacks, say 128 bits or more from a random source of high quality. The cryptographically secure hash could be the standard NIST FIPS 180-1 sha-1, which is believed to be of sufficient strength for this application.

When the present invention is used in a communication protocol, it will offer no confidentiality or integrity protection of the file that is transferred, as the file is sent in clear text over the network. It is deemed that many applications simply do not have the processing capacity to protect the file, i.e. by encrypting or check-summing it.

The file server will be able to authenticate the request for the file, to the extent that it comes from a legitimate client or has at least once come from a legitimate client. The last requirement allows replay attacks, but this is not a problem, since the attacker is assumed to be able to listen to the network traffic, and could in theory just wait to see the file again. He will not be able to request the transfer of another file, however.

The client who is requesting the file will be able to authenticate the server, i.e. ascertain that the file transfer is at least begun by a legitimate server. Since the invention offers no protection for the network, an attacker could hijack the connection once it has been started. However, this is an attack that is constrained as to the timing of the attack, and the attacker has to be ever-present on the node, increasing his exposure and risk of detection.

Since there are already two exchanges implicit in the typical data request case—i.e. the request for the file from the client to the server, and the response, i.e. the file being sent from the server to the client—it is advantageous not to include additional security protocol exchanges over those steps explained above. However, it is within the scope of the present invention as set out in the claims that such additional exchanges can be included.

The invention claimed is:

1. Method of authentication, wherein a client requests a file from a server, whereby the client and the server share a secret value and thereby belong to an accepted group, comprising the step of:

the client forms a first message including
   a filename,
   a nonce which is associated with the filename,
   a first hash value according to a first hash function formed from the filename and the secret value;
   further comprising the step of the server extracting
   the filename of a received first message,
   extracting the first hash value,
   forming a value of the received filename and the secret value,
   forming a second hash value according to the first hash function formed from the value of the filename and the secret value,
   comparing the first hash value with the second hash value and if the values are the same, establishing that the first message stems from a client belonging to the accepted group, otherwise establishing that the client does not belong to the accepted group.

2. Method according to claim 1, the inputs to said first hash function are concatenated.

3. Method of authentication, wherein a client requests a file from a server, whereby the client and the server share a secret value and thereby belong to an accepted group, comprising the step of:

the client forms a first message including
a filename,
a nonce which is associated with the filename,
a first hash value according to a first hash function formed from the filename and the secret value;
wherein the server responds to the request from the client by forming a second message including
a file corresponding to the requested filename,
the received nonce which is associated with the given filename,
a third hash value according to a second hash function formed from the value of the received nonce and the secret value; further comprising the step of the client
extracting the file of the received second message,
extracting the third hash value from the second message,
forming a value of the nonce associated with the filename and the secret value,
forming a fourth hash value according to the second hash function formed from the value of the nonce associated with the requested filename and the secret value,
comparing the third hash value with the fourth hash value and if the values are the same, establishing that the second message stems from a server belonging to the accepted group, otherwise establishing that the server does not belong to the accepted group.

4. Method according to claim 3, wherein the first hash function is the same as the second hash function.

5. A method of authentication, comprising:
a client sharing a secret value with a server, the client and the server thereby belonging to an accepted group, whereby
the client forms a first message comprising
a filename,
a nonce which is associated with the filename,
a first hash value according to a first hash function formed from the values of the filename and the secret value, and whereby
the client receives a second message from the server, the client
extracting a file of the received second message,
extracting a third hash value from the second message,
forming a value of the nonce and the secret value,
forming a fourth hash value according to a second hash function formed from the value of the nonce associated with the requested filename and the secret value,
comparing the third hash value with the fourth hash value and if the values are the same establishing that the second message stems from a server belonging to the accepted group, and if otherwise, establishing that the server does not belong to the accepted group.

6. A method of authentication, comprising:
a server sharing a secret value with a client, the client and the server thereby belonging to an accepted group, whereby the server receives a first message from the client, the server
extracting a filename and a nonce associated with the filename from the received first message,
extracting a first hash value from the received first message,
forming a value of the received filename and the secret value,
forming a second hash value according to the first hash function formed from the value of the filename and the secret value,
comparing the first hash value with the second hash value and if the values are the same establishing that the first message stems from a client belonging to the accepted group, otherwise establishing that the client does not belong to the accepted group.

7. The method according to claim 6, wherein the server responds by sending a second message comprising
a file corresponding to the requested filename,
a third hash value according to a second hash function formed from the value of the received nonce associated with the filename and the secret value.

* * * * *

UNITED STATES PATENT AND TRADEMARK OFFICE
CERTIFICATE OF CORRECTION

| | | |
|---|---|---|
| PATENT NO. | : 7,707,424 B2 | Page 1 of 1 |
| APPLICATION NO. | : 10/510911 | |
| DATED | : April 27, 2010 | |
| INVENTOR(S) | : Axelsson | |

It is certified that error appears in the above-identified patent and that said Letters Patent is hereby corrected as shown below:

In Column 3, Line 61, delete "H(SAN)" and insert -- H(S^N) --, therefor.

Signed and Sealed this

Twenty-seventh Day of July, 2010

David J. Kappos
*Director of the United States Patent and Trademark Office*